(12) United States Patent
Kaler et al.

(10) Patent No.: US 7,283,629 B2
(45) Date of Patent: Oct. 16, 2007

(54) DERIVING KEYS USED TO SECURELY PROCESS ELECTRONIC MESSAGES

(75) Inventors: Christopher G. Kaler, Sammamish, WA (US); Giovanni M. Della-Libera, Seattle, WA (US); Elliot L. Waingold, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 10/310,280

(22) Filed: Dec. 5, 2002

(65) Prior Publication Data

US 2004/0111600 A1 Jun. 10, 2004

(51) Int. Cl.
*H04L 9/00* (2006.01)
(52) U.S. Cl. .............................. 380/44; 380/45; 380/46; 380/259; 380/278; 380/280; 713/150; 713/164; 713/168
(58) Field of Classification Search ............ 380/44–46, 380/265, 262, 277, 278, 280, 259; 713/164, 713/168, 150
See application file for complete search history.

(56) References Cited

U.S. PATENT DOCUMENTS

| | | | | |
|---|---|---|---|---|
| 6,002,769 A | * | 12/1999 | McGough | .................... 380/28 |
| 6,965,674 B2 | * | 11/2005 | Whelan et al. | ............. 380/270 |
| 7,133,526 B2 | * | 11/2006 | Whelan et al. | ............. 380/270 |
| 2003/0149876 A1 | * | 8/2003 | McGough | .................... 713/171 |
| 2004/0111600 A1 | * | 6/2004 | Kaler et al. | ................. 713/150 |

OTHER PUBLICATIONS

EHBT: An Efficient Protocol for Group Key Management, S. Rafaeli et al. Proceedings of NGC'01: Networked Group Communication 2001, Springer-Verlag, Berlin, Germany, 2001, pp. 159-171.
Session Authentication Protocol for Web Services, S. Hada et al., Proceedings 2002 Symposium on Applications and the Internet (SAINT) Workshops, IEEE Computer Society, 2002, pp. 158-165.

* cited by examiner

*Primary Examiner*—Kim Vu
*Assistant Examiner*—Beemnet W Dada
(74) *Attorney, Agent, or Firm*—Workman Nydegger (57) ABSTRACT

A plurality of message processors exchange public and secret information. Based on the exchanged information, each message processor computes a key sequence such that any one of a plurality of keys may be derived from the key sequence depending on key derivation data. A first message processor generates key derivation data that can be used to derive a particular key from among the plurality of keys. The first message processor sends a security token that includes the generated key derivation data to express to at least one other message processor how to derive the particular key from the computed key sequence. At least a second message processor receives the security token expressing how to derive the particular key from the computed key sequence. The first and/or second message processors apply the key derivation data to the computed key sequence to derive the particular key.

35 Claims, 4 Drawing Sheets

DERIVING KEYS USED TO SECURELY PROCESS ELECTRONIC MESSAGES

BACKGROUND OF THE INVENTION

1. The Field of the Invention

The present invention relates to computer network security, and more specifically, to mechanisms for generically deriving keys for use in encrypting, decrypting, and signing electronic messages.

2. Background and Relevant Art

Computer networks have enhanced our ability to communicate and access information by allowing one computer or device (hereinafter both referred to as a "computing system") to communicate over a network with another computing system using electronic messages. In order for such electronic messaging to be meaningful, computing systems must process electronic messages in an appropriate manner. For example, an encrypted e-mail message must be decrypted using the proper decryption algorithm, then parsed into its various components (e.g., message body and "from", "to", "cc" and "time sent" header fields). If decryption or parsing are performed in an incorrect manner, the e-mail message would not be able to be displayed properly to a user.

Often, supplemental information is necessary or helpful in order to appropriately process an electronic message. For example, to appropriately encrypt or decrypt an electronic message, a computing system must have access to the appropriate secret code (frequently referred to as a "key"). It may be that a sending computing system encrypts an electronic message with an encryption key (e.g., a symmetric key or public key) and sends the encrypted electronic message to a receiving computer that attempts to decrypt the encrypted electronic message. However, the receiving computing system cannot decrypt the encrypted electronic message (and the encrypted electronic message will thus be essentially meaningless) if the receiving computer system does not have access to the appropriate decryption key (e.g., the symmetric key or a private key corresponding to the public key). Thus, computing systems will typically exchange a number of configuration parameters to establish these keys before any encrypted electronic messages are exchanged. This initial exchange of configuration parameters is often referred to as a "handshake."

One example of a handshake is the Secure Sockets Layer ("SSL") handshake sequence frequently used to establish a secure session between a client computing system (hereinafter referred to as a "client") and a server computing system (hereinafter referred to as a "server") on the Internet. An SSL handshake allows a server to authenticate itself to a client using public-key techniques and then allows the client and server to cooperate in the creation of session keys used for encryption, decryption, and tamper detection (signing) during the established session. An SSL handshake typically begins with the client and server exchanging information, such as, for example, SSL version number, cipher settings, random data, and other information needed for communication. During this initial exchange the server also sends a certificate to the client system.

The client performs a number of queries as to the trustworthiness of the certificate in order to authenticate the server. If the server is authenticated, the client can then generate a premaster secret for the session, encrypt the premaster secret with the server's public key (obtained from the certificate), and send the encrypted premaster secret to the server. The server uses its private key to decrypt the premaster secret, and then both the server and the client, starting with the premaster secret, perform a series of operations to generate the master secret.

Both the client and the server use the master secret to generate session keys, which are symmetric keys, used to encrypt and decrypt information exchanged during a subsequently established SSL session. The client sends a message to the server informing the server that future messages from the client will be encrypted with the session key. Likewise, the server sends a message to the client indicating that future messages from the server will be encrypted with the session key. After the SSL handshake sequence completes, the client and server exchange all encrypted data using the generated session keys.

However, a considerable amount of processing and data exchange must be performed (i.e., the entire SSL handshake sequence) before a secure session is established and any encrypted data can be transferred between the client and server. This processing and data exchange consumes both computer system and network bandwidth resources. Further, since SSL is a session-based protocol, the generated session keys are typically only valid for the duration of the established secure session. New session keys must be generated each time a new secure session is desired. Thus, if a client frequently requests secure connections of a very short duration, the consumption of computer system and network bandwidth resources can be quite substantial.

At times, it may also be desirable to generate new session keys for (or "re-key") a session that has been established for a longer period of time. This re-keying is performed to ensure that the same session keys are not used for an extended period of time resulting in a potential security risk. Unfortunately, to re-key an SSL session the entire handshake sequence must be performed. Thus, even in long standing sessions, the SSL handshake process may need to be repeated with some regularity thereby further consuming computer system and network bandwidth resources.

Performing an SSL handshake to re-key an established secure connection can also cause older messages to be undecipherable and/or difficult to process as these older message may have been encrypted with a prior session key. Further, conventional mechanisms for generating session keys are not well suited for securely processing messages across multiple sets of endpoints (e.g., between three or more computing devices within a distributed system). For example, since SSL is session-based, the use of session keys generated for an SSL session is restricted to the computing devices involved in the SSL session (e.g., a client and a server).

Therefore systems, methods, computer program products, and data structures for more efficiently deriving keys used to securely process electronic messages would be advantageous. Systems, methods, computer program products, and data structures for generically deriving keys that can be used by multiple sets of endpoints would also be advantageous.

BRIEF SUMMARY OF THE INVENTION

The foregoing problems with the prior state of the art are overcome by the principles of the present invention, which are directed towards methods, systems, computer program products, and data structures for generically deriving keys used for securely processing electronic messages. A first message processor exchanges information with at least a second message processor. The first message processor and second message processor each independently compute a key sequence (which may be the same key sequence) based on the exchanged information such that any one of a plurality of keys may be derived from the key sequence depending on key derivation data. The first message processor generates key derivation data that can be used to derive a particular key from among the plurality of keys.

The first message processor sends a security token that includes the key derivation data to express to at least the second message processor how to derive the particular key from the computed key sequence. The second message processor receives the security token including key derivation data that expresses how to derive a particular key from the computed key sequence. The first and/or second message processor apply the key derivation data to the computed key sequence to derive the particular key from the key sequence such that an electronic message may be securely processed using the particular key.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for generating keys used to securely process electronic messages. A first message processor and at least one other message processor exchange information. Based on the exchanged information, the first message processor and the at least one other message processor each independently compute a key sequence (e.g., a number of bits). Depending on key derivation data any one of a plurality of keys may be derived from the computed key sequence. The first message processor generates key derivation data that can be used to derive a particular key from the computed key sequence.

The first message processor sends a security token that includes the key derivation data to express to the at least one other message processor how to derive the particular key from the computed key sequence. A second message processor (which is included in the at least one other message processor) receives the security token. The included key derivation data expresses to the second message processor how to derive the particular key from the computed key sequence. The first and/or second message processor can apply the key derivation data to the computed key sequence to derive the particular key.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems can exchange data with each other. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that can enable the transport of electronic data between two entities such as computer systems or modules. The actual physical representation of a communication path between two entities is not important and may change over time. A logical communication link can include portions of a system bus, a local area network, a wide area network, the Internet, combinations thereof, or portions of any other path that may facilitate the transport of electronic data. Logical communication links can include hardwired links, wireless links, or a combination of hardwired links and wireless links. Logical communication links may also include software or hardware modules that condition or format portions of data so as to make them accessible to components that implement the principles of the present invention. Such components may include, for example, proxies, routers, firewalls, or gateways. Logical communication links may also include portions of a Virtual Private Network ("VPN").

In this description and in the following claims, a "message processor" is defined as one or more modules (hardware and/or software) that operate together to perform messaging operations on electronic messages. Messaging operations may include, for example, initiating a message, accessing a message, appending information to a message, sending a message, receiving a message, routing a message, removing information from a message, and terminating a message. Any message processor can include the functionality to perform one or more of these messaging operations. It may be that the modules of a message processor are included within a general-purpose computer system, such as, for example, within a laptop or desktop computer system. On the other hand, it may also be that the modules of a message processor exist as a standalone special-purpose computer system, such as, for example, a router.

In this description and in the following claims, "securely processing" is defined as processing an electronic message to encrypt at least a portion of the electronic message, decrypt at least a portion of the electronic message, sign at least a portion of the electronic message, or validate the signature of at least a portion of the electronic message (e.g., tamper detection).

In this description and in the following claims, a "key" is defined as a secret code used by a module to securely process an electronic message. The principles of the present invention can be implemented using keys of virtually any size, such as, for example, 40-bit, 80-bit, 56-bit, 128-bit, and 168-bit. However, it should be understood that the listed key sizes are merely examples. It would be apparent to one skilled in the art, after having reviewed this description, that a wide variety of different key sizes, in addition to those listed, may be used to securely process an electronic message in accordance with the present invention.

In this description and in the following claims, a "schema" is defined as an expression of a shared vocabulary between a plurality of computer systems and/or a plurality of message processors that allows the plurality of computer systems and/or the plurality of message processors to process documents according to the expressed shared vocabulary. For example, an eXtensible Markup Language ("XML") schema can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, any computer system or message processor that can access an XML schema can process XML documents in accordance with the XML schema. In this definition and the following claims, "schema-based" refers to being defined by and/or within a schema.

In this description and the following claims, "key derivation data" is defined generally to include any data associated with deriving a key such that an electronic message may be securely processed using the key. Key derivation data is defined to include, for example, information about the configuration of a message processor (e.g., components, versions of modules, etc.), shared secrets, key properties, key names, key versions, key offsets, key sizes, key nonces, key labels, key generation algorithms, computed key sequences, and derived keys. Key derivation data can be represented using virtually any types of values including, numeric values (e.g., 12, D4, 11001, etc.), characters of text (e.g., "c", "v", "6", etc.), strings of text (e.g., "Ran=", "Version 4", etc.), or user-defined values. It may be that key derivation data includes a plurality of values such that each value represents the value of a field in a data structure.

In this description and the following claims, a "key derivation marker" is defined as a data structure that is configured to store key derivation data. For example, a key derivation marker can be a header within a header portion of an electronic message where key derivation data is maintained.

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

Figure 1:
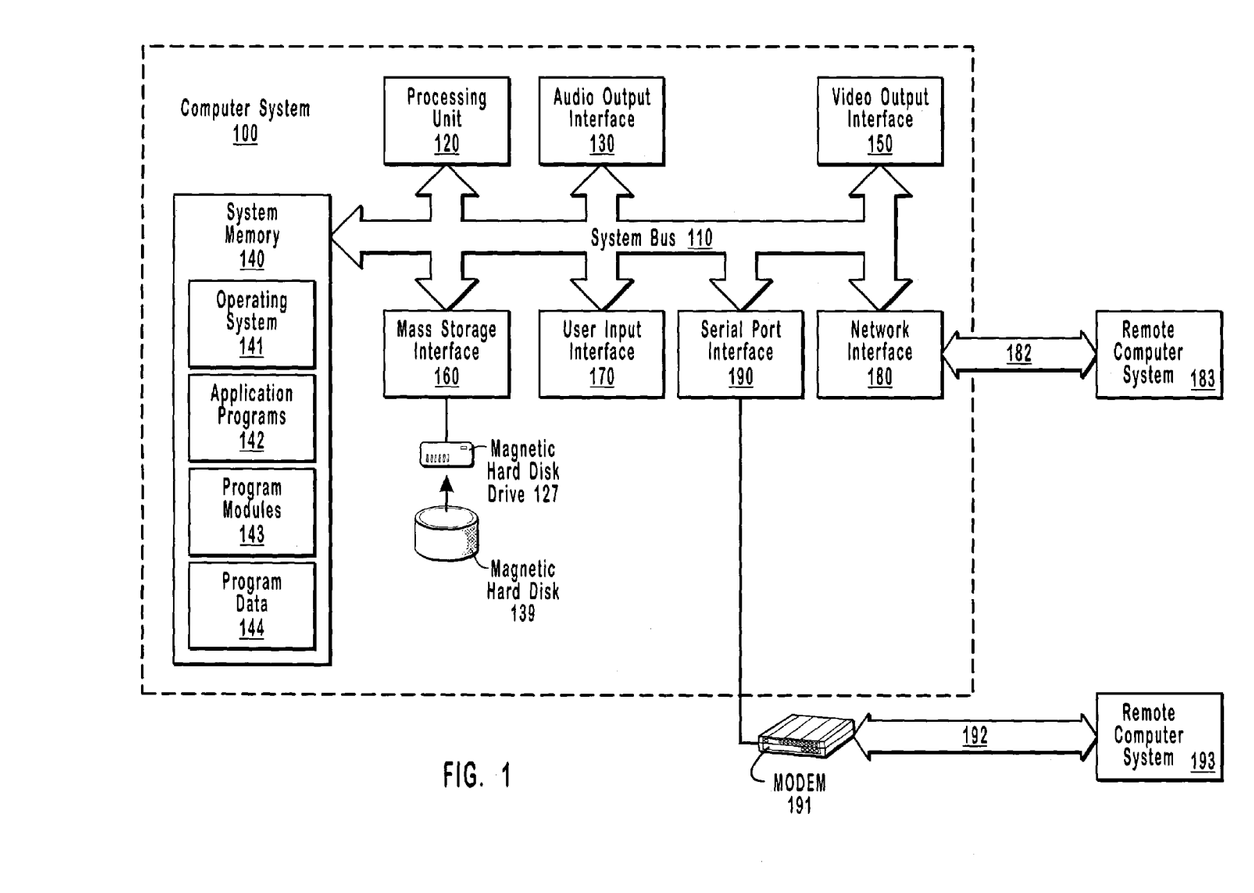
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a computer system 100. Computer system 100 may be a personal computer that has been adapted to perform the operations disclosed herein. It should be understood that computer system 100 is merely an example of one possible computer system configuration that can be used to practice the principles of the present invention.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 can also include video output interface 150, which provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present C) invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules and other data for computer system 100. For example, magnetic hard disk 139 can store one or more program modules including operating system 141, application programs 142, other program modules 143, and program data 144.

Computer system 100 can be network connectable to networks, such as, for example, an office-wide or enterprise-wide computer network, an intranet and/or the Internet. Computer system 100 can exchange data with external sources, such as, for example, remote computer systems and/or databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. For example, remote computer system 183 can be a client, an application server, or an authentication server.

Likewise, computer system 100 includes serial port interface 190, through which C computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. For example, remote computer system 193 can be a client, an application server, or an authentication server.

Alternatively, computer system 100 can exchange data with external sources through other interfaces, such as, for example, a parallel port, a game port, or a universal serial bus ("USB") port.

It should be understood that the described network connections are merely example. It would be apparent to one skilled in the art, after having reviewed this description, that a wide variety of network connection techniques, in addition to those described with reference to FIG. 1, may be used to facilitate the exchange of data between computer system 100 and external sources.

While FIG. 1 represents a suitable operating environment for the present invention, the principles of the present invention may be employed in any computer system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, message processor modules, as well as associated data, including electronic messages, key derivation data, key derivation markers, and schemas, may be stored and accessed from any of the computer-readable media associated with computer system 100. For example, portions of such modules and portions of associated program data may be included in operating system 141, application programs 142, program modules 143 and/or program data 144, for storage in system memory 140. When a mass storage device, such as, for example, magnetic hard disk 139, is coupled to computer system 100, such modules and associated program data may also be stored in the mass storage device.

In a networked environment, program modules and associated data, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
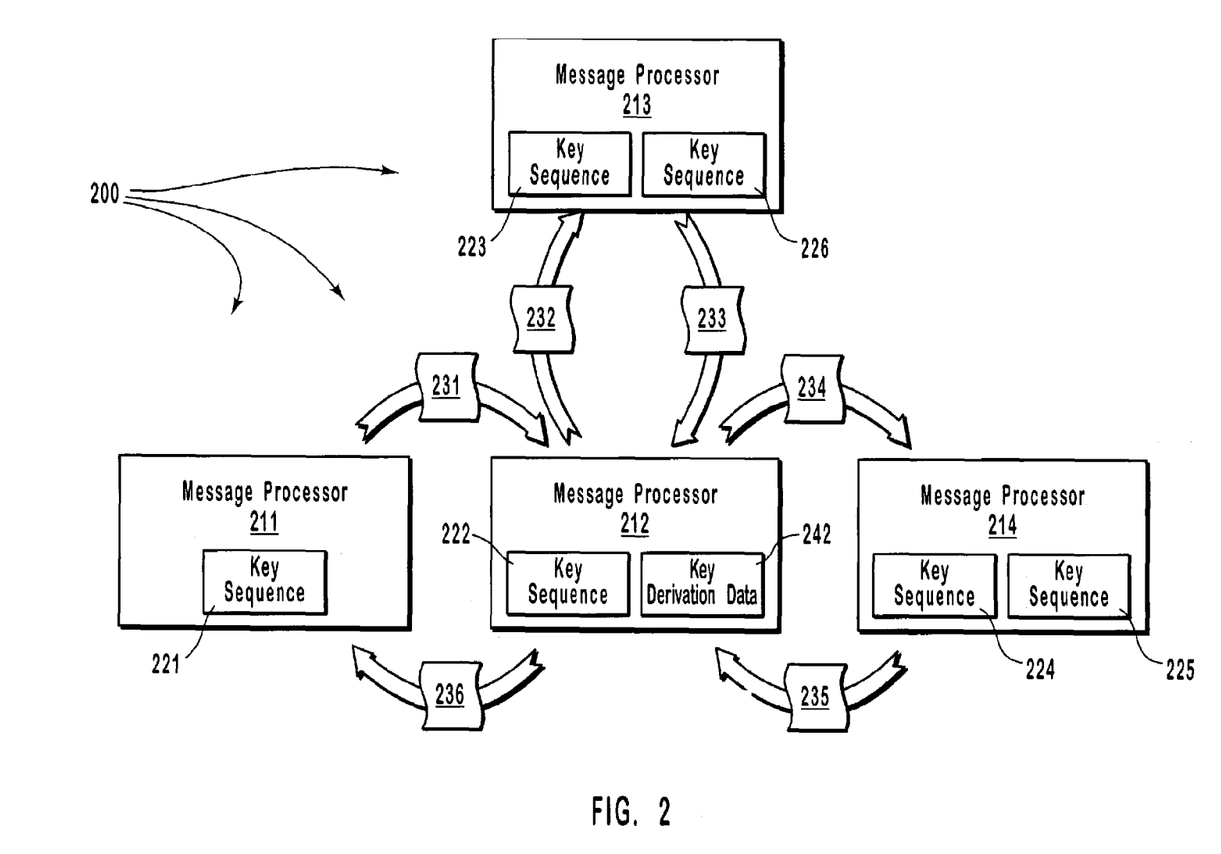
FIG. 2 illustrates an example of a network architecture that can facilitate generically deriving keys used to securely process electronic messages.

FIG. 2 illustrates an example of network architecture 200 in which keys for securely processing an electronic message can be derived. Depicted in network architecture 200 are message processors 211, 212, 213 and 214. Network architecture 200 may be part of a distributed system that includes any number of other message processors in addition to message processors 211, 212, 213, and 214. The message processors included in the distributed system, including those depicted in network architecture 200, can be connected to one another via one or more logical communication links (not shown).

Figure 3:
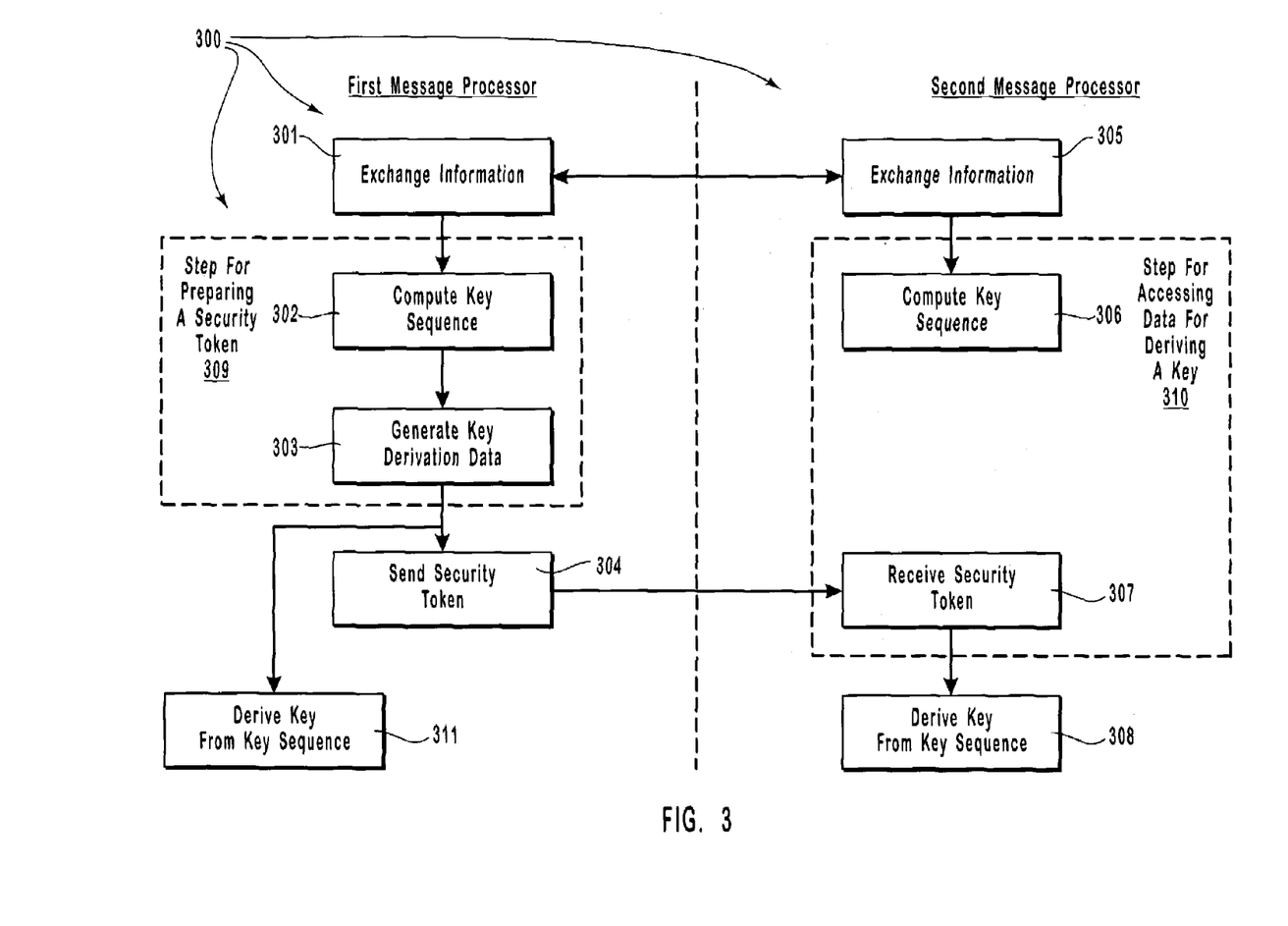
FIG. 3 illustrates a flowchart of a method for enabling a plurality of message processors to generate a particular key for securely processing electronic messages.

FIG. 3 illustrates a flowchart of a method 300 for enabling a plurality of message processors to generate a particular key such that electronic messages may be securely processed using the particular key. The method 300 will be described with respect to the message processors depicted in network architecture 200.

Method 300 includes an act of exchanging information (act 301). Act 301 can to include exchanging information with at least one other message processor. For example, message processor 212 can exchange information with at least one other message processor (e.g., message processor 211 and/or message processor 213 and/or message process 214) depicted in network architecture 200. Each of the at least one other message processors also exchanges information with message processor 212 (act 305).

During the exchange of information, message processor 212 can send information to and receive information from one or more other message processors. For example, message process 212 can send information to message processor 211 (as illustrated by message 236) and can receive information from message processor 211 (as illustrated by message 231). Message processor 212 can similarly exchange information with message processors 213 and 214 (as shown by corresponding messages 232, 233, 234 and 235). The information exchange can include exchanging public information, such as, for example, configuration information and randomly generated data.

The information exchange can also include exchanging secret information. For example, message processor 211 can use a public key for message processor 212 to encrypt information that is sent to message processor 212 (thus some information in message 231 may be encrypted). Intermediary message processor 212 may use a corresponding private key to decrypt the encrypted information. Likewise, message processor 212 can use a public key for message processor 211 to encrypt information that is sent to message processor 211 (thus some information in message 236 may be encrypted). Message processor 211 may use a corresponding private key to decrypt the encrypted information. However, using public-key encryption to exchange secret information is merely an example and other mechanisms for securing the exchange of secret information can be used.

It may be that a message processor depicted in network architecture 200 receives a secret from a trusted third party. For example, message processor 211 may receive a secret associated with message processor 214 from a trusted message processor that is external to network architecture 200. It may also be that information is exchanged manually. For example, administrators of the message processors depicted in network architecture 200 can exchange information via telephonic or paper delivery mechanisms. Information exchanged telephonically or by paper can then be used to prepare a security token, compute a key sequence, and/or generate key derivation data.

The method 300 includes a functional, result-oriented step for preparing a security token (step 309). Step 309 may include any corresponding acts for accomplishing the result of preparing a security token. However, in the illustrated example of FIG. 3, the step 309 includes a corresponding act of the first message processor computing a key sequence (act 302). Act 302 can include computing a key sequence based on the exchanged information such that any one of a plurality of keys may be derived from the key sequence depending on key derivation data. In network architecture 200, message processor 212 can compute key sequence 222 based on information exchanged with message processors 211, 213, and 214.

The frequency with which key sequences are computed is configurable. In some embodiments, it may be desirable to compute a key sequence for each message that is transferred from a message processor. For example, message processor 211 may be configured to compute a new key sequence before each message is sent from message processor message 211. In other embodiments, it may be desirable to compute a key sequence after a specified amount of data has been transferred or a specified number of messages have been transferred using a previous key. For example, message processor 212 may be configured to compute a new key sequence after every tenth message that is sent from message processor 212.

A key sequence can be a randomly generated number of bytes (or bits), such as, for example, 478 bytes, where each byte contains a random value. It may be that specific portions of a key sequence are allocated for different versions of a key. For example, a key sequence may be a sequence of 50 bytes that is divided into ten 40-bit (5 byte) portions. Each of the 40-bit portions can be viewed as a version of a key. Thus, the first 5 bytes (bytes 1-5) of the key sequence can be viewed as a first version of the key, the second 5 bytes (bytes 6-10) of the key sequence can be viewed as a second version of the key, the third 5 bytes (bytes 11-15) can be viewed as third version of the key, etc.

It may be that random values included in a key sequence are cryptographically random values. Cryptographically random values are designed to be much more difficult to predict than other types of random values. Algorithms used to generate cryptographically random numbers may measure variances in the state of low-level devices (e.g., keystrokes, disk drive arm jitter, etc.) that are essentially unpredictable. These algorithms may also utilize cryptographically strong pseudo-random number generators ("PRNGs"), which process the measured state variances to generate random values.

Step 309 also includes a corresponding act of generating key derivation data (act 303). Act 303 can include generating key derivation data that can be used to derive a particular key from among the plurality of keys (included in a key sequence). In network architecture 200, message processor 212 can generate key derivation data 242 that can be used to derive a key from key sequence 222.

The method 300 includes an act of the first message processor deriving a key from the key sequence (act 311). Act 311 can include applying the generated key derivation data to the computed key sequence to derive the particular key. In network architecture 200, message processor 212 can apply generated key derivation data 242 to key sequence 222 to derive a key.

Parallel to act 311, the method 300 includes an act of sending the security token (act 304). Act 304 can include sending a security token that includes the generated key derivation data to express to the at least one other message processor how to derive the particular key from the computed key sequence. In network architecture 200, message processor 212 can send a security token to message processors 211, 213, and 214 to express how to derive the particular key from a computed key sequence. In some embodiments, a security token is included in an electronic message that is sent to the at least one other message processor. As such, message processor 212 can include a security token in electronic messages that are sent to message processors 211, 213, and 214 (as illustrated by corresponding messages 232, 234, and 236).

Message processors can maintain key derivation data (whether it be generated key derivation data or key derivation data received from a security token) in a storage location. Thus, not every electronic message is required to include a security token. When an electronic message that does not include a security token is received, maintained key derivation data can be used to securely process the electronic message. Receiving an electronic message that includes a security token may indicate that the secure processing of electronic messages is to be re-keyed. That is, a security token can include new key derivation data for deriving a new key from an existing key sequence.

In some embodiments, a message processor may continue to maintain older key derivation data even after newer key derivation data has been generated or received. This reduces the risk of older messages becoming more difficult to process as a result of re-keying. When a message processor maintains older key derivation data that expresses how to derive a key for an older message, the message processor may be able to securely process an older message based on the older key derivation data (even if newer key derivation data has subsequently been generated or received).

Figure 4:
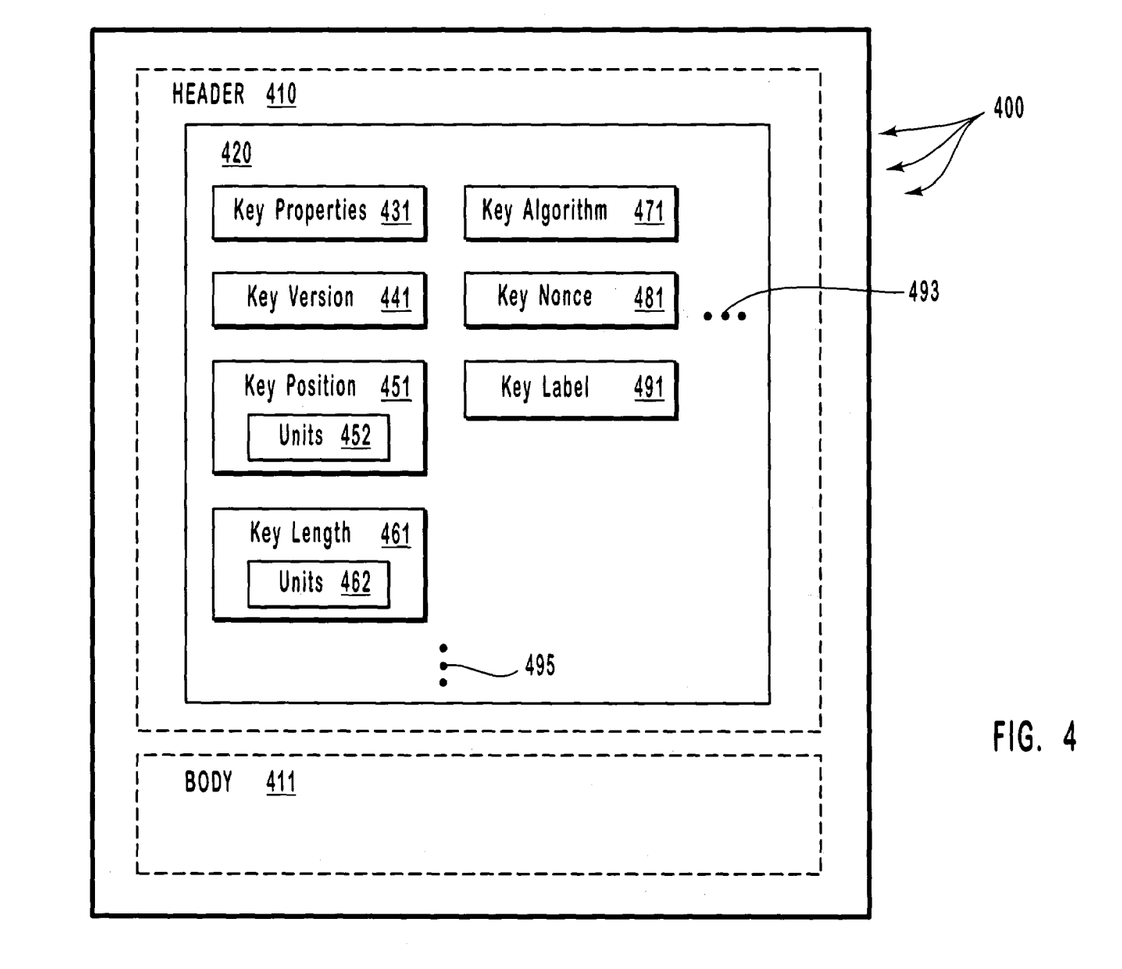
FIG. 4 illustrates an example of a message containing a key derivation marker.

Depicted in FIG. 4 is a message 400. Message 400 is an example of one format of message that can be used when implementing the principles of the present invention. Any of the messages 231-236 may be of a format similar to message 400. Message 400 includes header 410 and body 411. Generally, header data included in header 410 determines how the body 411 is to be processed. In the example message 400, header 410 includes key derivation marker 420, which further includes the elements key properties 431, key version 441, key position 451, key length 461, key algorithm 471, key nonce 481, and key label 491. Ellipsis 493 and vertical ellipsis 495 illustrate that other key derivation data can be included within key derivation marker 420. Although a single key derivation marker (key derivation marker 420) is illustrated within header 410 it should be understood other key derivation markers could also be included.

Although depicted within header 410, key derivation marker 420 may also be included in the body of an electronic message, such as, for example, within body 411. In some embodiments, one or more of the elements of key derivation marker 420 are included in header 410 and one or more of the elements of key derivation marker 420 are included in body 411.

In some embodiments, key derivation data in an element can be of particular units. To indicate that key derivation data is of particular units, such as, for example, bytes, bits, etc., a unit indicator can be associated with the key derivation data. Within electronic message 400 this can be implemented by including a unit element (e.g., units 452 and 462) within another element. Unit elements in message 400 can represent a name-value pair, such as, for example, a unit attribute and a corresponding unit attribute value. An attribute value can be represented using virtually any type of value including, a numeric value (e.g., 9, FE, 10010, etc.), a character of text (e.g., "a", "f", "7", etc.), a string of text (e.g., "bits", "bytes", etc.), or a user-defined value. It may be that an attribute value represents the value of a field in a data structure.

It should be understood that the present invention is not limited to messaging using any specific transport protocol and format. However, one example protocol that may be used to implement the principles of the present invention is called Simple Object Access Protocol ("SOAP"). Message 400 may be a SOAP message that uses any number of lower level protocols, such as, for example, HyperText Transfer Protocol ("HTTP") or Direct Internet Message Encapsulation ("DIME") as a transport. The following is an example structure in which a derived key marker is included within the header of an example SOAP envelope:

```
1.   <Envelope>
2.     <Header>
3.       .
4.       .
5.       .
6.       <DerivedKey KeyRef=". . .">
7.         <Properties>
8.           KEY METADATA
9.         </Properties>
10.        <Version>
11.          KEY VERSION DATA
12.        </Version>
13.        <Position Unit =". . .">
14.          KEY POSITION DATA
15.        </Position>
16.        <Length Unit = ". . .">
17.          KEY LENGTH DATA
18.        </Length>
19.        <Algorithm>
20.          KEY ALGORITHM DATA
21.        </Algorithm>
22.        <Nonce>
23.          KEY NONCE DATA
24.        </Nonce>
25.        <Label>
26.          KEY LABEL DATA
27.        </Label>
28.      </DerivedKey>
29.      .
30.      .
31.      .
32.    </Header>
33.    <Body>
34.      .
35.      .
36.      .
37.    </Body>
38. </Envelope>
```

The header portion of the example SOAP envelope (i.e., between the <Header> and </Header> tags) can include one or more free-form XML elements. Alternately, the header portion of the example SOAP envelope can include one or more XML elements that are defined in accordance with an XML schema accessible to the message processors depicted in network architecture 200. Where an ellipsis or vertical ellipsis appears, this indicates that other header information and/or body information can be included in the example SOAP envelope.

The example SOAP envelope includes a DerivedKey element (between the <DerivedKey> and </DerivedKey> tags) with a "Properties" element, a "Version" element, a "Position" element, a "Length" element, an "Algorithm" element, a "Nonce" element, and a "Label" element. However, inclusion of all of these elements within the example SOAP envelope (or any other message) is optional. These elements are included merely to illustrate one example of some of the elements that can be used to implement the principles of the present invention. Depending on the desired functionality none, one, some, or all of these elements, can be included in an electronic message. Further, it would be apparent to one skilled in the art, after having reviewed this description, that a wide variety of other elements, in addition to the illustrated elements, can be used to implement the principles of the present invention.

When particular elements and/or attributes are not included in an electronic message this may indicate that key derivation data, which would otherwise be represented by the elements and/or attributes, is implied or inferred from a context. For example, a plurality of message processors may agree (e.g., during an initial exchange of information) that all derived keys will have a length of 128 bits. As such, the plurality of message processors may not include a Length element within security tokens. A plurality of message processors can agree on other possible key derivation data, such as, for example, the name of a shared secret, key derivation algorithms, nonces, labels, offsets, versions, and units. Thus, key derivation data for deriving a key in a particular context (i.e., where some key derivation data is implied or inferred) can be included in a security token, while other possibly redundant key derivation data is not included in the security token.

The DerivedKey element has a "KeyRef" attribute, which can have an attribute value of the name of the shared secret used for the key derivation. The KeyRef attribute and a corresponding KeyRef attribute value can be viewed as a name-value pair.

The Properties element (lines 7-9) is an example of an element that can be used to store metadata (e.g., in Key Metadata) describing how and when a key was derived. Key Metadata can include the name of a key, which can be used to derive other keys from the named key.

The Version element (lines 10-12) is an example of an element that can be used to store a value (e.g., in Key Version Data) for a key version of the key that is to be derived. For example, if portions of a key sequence are allocated for different versions of a key this value can specify which portion is to be derived as a key.

The Position element (lines 13-15) is an example of an element that can be used to store a value (e.g., in Key Position Data) for a position within a key sequence. The Length element (lines 16-18) is an example of an element that can be used to store a value (e.g., in Key Length Data) for a key length. A position and length may be used to derive a key from a key sequence. For example, within a 100 byte key sequence it may be indicated that a 56-bit key (e.g., Key Length Data includes 56) is to be derived starting at byte 35 (e.g., Key Position Data includes 35) of the 100 byte key sequence.

In some embodiments, multiple Position elements can be included within a SOAP envelope (or other electronic message). For example, a first Position element can have a first value (e.g., 347) for a first position (e.g., the $347^{th}$ byte) in a key sequence (e.g., of 2048 bytes) and a second Position element can have a second value (e.g., 1879) for a second position (e.g., the $1897^{th}$ byte) in the key sequence. However, additional Position elements can be included if it is desirable to designate other positions within the byte stream.

Likewise, multiple Length elements can also be included within a SOAP envelope (or other electronic message). For example, at the first position in the key sequence (the 347th byte) it may be desirable to retrieve a first key with a length of 14 bits. As such, a first Length element corresponding to the first Position element can have a value of 14. At the second position in the key sequence (the $1897^{th}$ byte) it may desirable to retrieve a second key with a length of 27 bytes. As such, a second Length element corresponding to the second Position element can have a value of 27. Alternately, if the second Length element had units of bits, the second Length element may have a value of 216. The first key and the second key can be combined into a derived key.

By using multiple Position and Length elements, keys of any granularity (even down to the granularity of a single bit) can be derived from any portions of a key sequence.

The Algorithm element (lines 19-21) is an example of an element that can be used to store an indication (e.g., in Key Algorithm Data) of the algorithm that is to be used to generate a key. Virtually any key generation algorithm, such as, for example, the P_SHA1 function described in Transport Layer Security ("TLS"), can be used.

The Nonce element (lines 22-24) is an example of an element that can be used to store a random value (e.g., in Key Nonce Data) used to derive a key. The Label element (lines 25-27) is an example of element that can be used to store a value (e.g., in Key Label Data) for labeling a derived key. A nonce and label can be used in combination to derive a unique per message key from a key sequence. For example, the random value can be used to randomly identify a position, length, or version, within a key sequence. This may be used to derive a key for securely processing data that was included in an electronic message along with the random value.

The Position and Length elements (at lines 13 and 16) also include a "Unit" attribute. The Unit attribute can be used to indicate the units, such as, for example, bytes, bits, etc., associated with the corresponding element.

It should be understood that the arrangement of elements and data in the example SOAP envelope (or any other electronic message) is not important. For example, DerivedKey, Property, Version, Length, Position, Algorithm, Nonce, and Label elements (and corresponding data) can be included in the body portion of an electronic message. It may also be that an electronic message does not include separate header and body portions and thus elements and data can simply be arranged as desired within the electronic message.

In some embodiments, keys can be derived recursively. That is, a previously derived key can be used as the basis for a key sequence to derive other keys. For example, after exchanging information, a plurality of message processors may each compute a 1024 byte key sequence. From this 1024 byte key sequence, a 256-bit key may be derived and named. The 256-bit key may then be referenced as the basis for a key sequence to derive other keys, for example, by including the name of the 256-bit key within Key Properties Data in a security token.

Returning to FIG. 3, the method 300 includes a functional, result-oriented step for accessing data for deriving a key (step 310). Step 310 may include any corresponding acts for accomplishing the result of accessing data for deriving a key. However, in the illustrated example of FIG. 3, the step 310 includes a corresponding act of the second message processor computing a key sequence (act 306). Act 306 can include computing a key sequence based on the exchanged information such that any one of a plurality of keys may be derived from the key sequence depending on key derivation data. In network architecture 200, message processors 211, 213, and, 214 can compute corresponding key sequences 221, 223, and 224, based on the information exchanged with message processor 212. It may be that the bytes of key sequences 221, 222, 223, and 224 are arranged similarly such that the same key derivation data applied to each of the key sequences would derive the same key.

Step 310 also includes a corresponding act of receiving a security token (act 307). Act 307 can include receiving a security token including key derivation data that expresses how to derive a key from the computed key sequence such that an electronic message may be securely processed using the particular key. In network architecture 200, message processors 211, 213, and 214 can receive a security token from message processor 212. The security token may be included in an electronic message, such as, for example, a SOAP envelope as previously described.

The method 300 includes an act of the second message processor deriving a key from the key sequence (act 308). Act 308 can include applying the key derivation data included in the security token to the computed key sequence to derive the particular key. In network architecture 200, message processors that receive key derivation data (e.g., message processors 211, 213, and 214) can apply the key derivation data to derive a key. For example, message processor 211 can apply key derivation data received in message 236 to key sequence 221 to derive a key. Thus, if key sequences 221 and 222 are similarly arranged, message processor 211 and message processor 212 can derive the same key.

In some embodiments, the secure processing of electronic messages is re-keyed. For example, at specified intervals or as the result of some event, message processor 212 may generate new key derivation data that differs from previously generated key derivation data. Message processor 212 can include this new key derivation data in a security token and send the security token to message processors 211, 213, and 214.

Message processors (e.g., from among message processors 211, 213, and 214) that receive the new key derivation data can apply the new key derivation data to a computed key sequence (e.g., key sequences 221, 223, and 224) to derive a new key. However, each of message processors 211, 212, 213, and 214 can still maintain any previously derived keys. Thus, messages that are to be securely processed with the new key or with any previously derived keys can still be processed.

It may be that a designated transition period is established for some time after the secure processing of electronic messages is re-keyed. Thus, for some time message processors will securely process electronic messages with both an older key and newer key. Then, after the transition period expires, message processors can choose to no longer securely process electronic messages with the older key. The length of the transition period can be established as part of the context between message processors 211, 212, 213, and 214 or can be included within an electronic message at the time a new key is derived.

Other message processors in network architecture 200 may also exchange information and compute key sequences for the derivation of keys. For example, message processor 213 and message processor 214 may exchange information (without exchanging information with message processors 211 and 212) and compute key sequences, such as, for example, key sequences 225 and 226. Message processors 213 and 214 may use key sequences 225 and 226 when deriving keys for securely processing messages between each other, but may continue to use key sequences 223 and 224 when deriving keys for securely processing messages with message processor 212.

Thus, a message processor can have any number of key sequences for deriving keys for secure communication, such as, for example, a key sequence for each different context. Key derivation data for deriving keys may also be interpreted differently as different contexts (having different portions of implied or inferred key derivation data) can exist between different (or the same) message processors. For example, message processors 213 and 214 may agree on a common key length, while message processors 212 and 213 do not agree on a common key length. However, message processors 212 and 213 may agree on a key derivation algorithm, while message processors 213 and 214 do not. Two message processors can also have a plurality of contexts between them. For example, when using a first algorithm to derive keys, message processors 211 and 213 may agree to a key length of 128 bits. However, when using a second different algorithm to derive keys, message processors 211 and 213 may not agree on key length (or may agree to a key length other than 128 bits).

The principles of the present invention allow keys to be flexibly derived based on the desires of the message processors that will use the derived keys to securely process messages. Further, when re-keying the secure processing of electronic messages there is no need to perform processor and bandwidth intensive handshake procedures. Additionally, the resources needed to process older messages can be significantly reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a distributed system including a first message processor that is communicatively coupled to one or more other message processors such that the first message processor and the one or more other message processors can communicate by transferring electronic messages, a method for the first message processor to express to at least one of the other message processors how to identify a key that can be used to securely process an electronic message, the method comprising:

an act of receiving an electronic message including shared secret information from a second message processor, the shared secret information indicating one or more key derivation data elements;

an act of computing a key sequence of one or more randomly generated bytes based on the received shared secret information, a plurality of specific identifiable portions within the computed key sequence allocated for a plurality of corresponding different versions of a key such that any one of the plurality of keys can be identified within the computed key sequence depending on key derivation data;

an act of detecting that at least one key derivation data element is absent from the received one or more key derivation elements included in the electronic message;

in response to the detection, an act of inferring the at least one absent key derivation data element from a second one or more key derivation data elements that the first and second message processor previously exchanged, the previously exchanged second one or more key derivation data elements providing a context for deriving keys from the computed key sequence;

an act of generating key derivation data from the one or more received key derivation data elements and the at least one inferred key derivation data element, the key derivation data used to identify a particular key from among the plurality of keys allocated within the computed key sequence;

an act of sending a security token that includes the received one or more key derivation data elements to express to the second message processor how to identify the particular key from within the computed key sequence such that an electronic message may be securely processed using the particular key;

an act of applying the generated key derivation data to the computed key sequence to identify the particular key from within the computed key sequence; and an act of using the identified key to securely process the electronic message.

2. The method as recited in claim 1, wherein the act of computing a key sequence based on shared secret information comprises an act of computing a sequence of bits.

3. The method as recited in claim 2, wherein the act of computing a key sequence comprises an act of computing a sequence of bits that is divided into different versions of a key.

4. The method as recited in claim 1, wherein the act of generating key derivation data comprises an act of generating key metadata that can be used to describe the particular key within the computed key sequence.

5. The method as recited in claim 1, wherein the act of generating key derivation data comprises an act of generating key version data that can be used to identify the particular key within the computed key sequence.

6. The method as recited in claim 1, wherein the act of generating key derivation data comprises an act of generating key position data that can be used to identify the particular key, the key position data indicating a position within the computed key sequence that the particular key begins.

7. The method as recited in claim 1, wherein the act of generating key derivation comprises an act of generating key length data that can be used to identify the particular key, the key length data indicating the length of the particular key within the computed key sequence.

8. The method as recited in claim 1, wherein the act of generating key derivation data comprises an act of generating key algorithm data that can be used to identify the particular key within the computed key sequence.

9. The method as recited in claim 1, wherein the act of generating key derivation data comprises an act of generating key nonce data that can be used to identify the particular key within the computed key sequence.

10. The method as recited in claim 1, wherein the act of generating key derivation data comprises an act of generating key label data that can be used to identify the particular key within the computed key sequence.

11. The method as recited in claim 1, wherein the act of generating key derivation data comprises an act of generating new key derivation data such that the new key derivation data can be used to re-key the secure processing of electronic messages by identifying a new key within the key sequence that will replace a previously identified older key also identified within the computed key sequence.

12. The method as recited in claim 11, further comprising:
an act of maintaining the previously identified older key to securely process electronic messages that were securely generated with the previously identified older key before the new key was identified within the computed key sequence.

13. The method as recited in claim 1, wherein the act of generating key derivation data an act of generating key derivation data that can be used to identify the particular key within the computed key sequence for encrypting an electronic message.

14. The method as recited in claim 1, wherein the act of generating key derivation data comprises an act of generating key derivation data that can be used to identify the particular key within the computed key sequence for signing an electronic message.

15. The method as recited in claim 1, wherein the act of sending a security token that includes the received one or more key derivation data elements to express to the the second message processor how to identify the particular key from within the computed key sequence comprises the act of including the security token in one or more Simple Object Access Protocol envelopes that are sent to the at least one other message processor.

16. The method as recited in claim 1, further comprising:
an act of exchanging information that can be used to compute a key sequence prior to computing the computed key sequence, the exchanged information including the secret information used to compute the computed key sequence.

17. The method as recited in claim 16, wherein the act of exchanging information that can be used to compute a key sequence comprises an act of exchanging public information with at least one other message processor.

18. The method as recited in claim 16, wherein the act of exchanging information that can be used to compute a key sequence comprises an act of sharing secret information with at least one other message processor.

19. In a distributed system including a first message processor that is communicatively coupled to one or more other message processors such that the first message processor and the one or more other message processors can communicate by transferring electronic messages, a method for a second message processor from among the one or more other message processors to receive an expression of how to identify a key that can be used to securely process an electronic message, the method comprising:
an act of receiving security token that includes shared secret information and one or more key derivation data elements expressing how to identify a particular key from within a computed key sequence;
an act of computing a key sequence of one or more randomly generated bytes based on the received shared secret information, a plurality of specific identifiable portions within the computed key sequence allocated for a plurality of corresponding different versions of a key such that any one of the plurality of keys can be identified within the computed key sequence depending on key derivation data;
an act of detecting that at least one key derivation data element is absent from the received one or more key derivation data elements;
in response to the detection, an act of inferring the at least one absent key derivation data element from a second one or more key derivation data elements that the first and second message processor previously exchanged, the previously exchanged second one or more key derivation data elements providing a context for deriving keys from the computed key sequence;
an act of generating key derivation data from the one or more received key derivation data elements and the at least one inferred key derivation data element, the key derivation data used to identify a particular key from among the plurality of keys allocated within the computed key sequence;
an act of applying the generated key derivation data to the computed key sequence to identify the particular key from within the computed key sequence; and
an act of using the identified key to securely process an electronic message.

20. The method as recited in claim 19, wherein the act of computing a key sequence comprises an act of computing a sequence of bits.

21. The method as recited in claim 19, wherein the act of computing a key sequence comprises an act of computing a sequence of bits that is divided into different versions of a key.

22. The method as recited in claim 19, wherein the act of receiving a security token comprises an act of receiving an electronic message that includes the security token.

23. The method as recited in claim 19, wherein the act of receiving a security token comprises an act of receiving a security token that includes key metadata that can be used to describe the particular key within the computed key sequence.

24. The method as recited in claim 19, wherein the act of receiving a security token comprises an act of receiving a security token that includes key version data that can be used to identify the particular key within the computed key sequence.

25. The method as recited in claim 19, wherein the act of receiving a security token comprises an act of receiving a security token that includes key position data, the key position data indicating a position within the computed key sequence that the particular key begins.

26. The method as recited in claim 19, wherein the act of receiving a security token comprises an act of receiving a security token that includes key length data, the key length data indicating the length of the particular key within the computed key sequence.

27. The method as recited in claim 19, wherein the act of receiving a security token comprises an act of receiving a security token that includes key algorithm data that can be used to identify the particular key within the computed key sequence.

28. The method as recited in claim 19, wherein the act of receiving a security token comprises an act of receiving a security token that includes key nonce data that can be used to identify the particular key within the computed key sequence.

29. The method as recited in claim 19, wherein the act of receiving a security token comprises an act of receiving a security token that includes key label data that can be used to identify the particular key within the computed key sequence.

30. The method as recited in claim 19, wherein the act of receiving a security token comprises an act of receiving a security token that refers to a previously identified key from within the key sequence even through a more recent key was subsequently identified from within the key sequence.

31. The method as recited in claim 1, further comprising an act of exchanging information that can be used to compute a key sequence prior to computing the computed key sequence, the exchanged information including the secret information used to compute the computed key sequence.

32. The method as recited in claim 31, wherein the act of exchanging information that can be used to compute a key sequence comprises an act of exchanging public information with the first message processor.

33. The method as recited in claim 31, wherein the act of exchanging information that can be used to compute a key sequence comprises an act of sharing secret information with the first message processor.

34. A computer program product for use in a distributed system including a first message processor that is communicatively coupled to one or more other message processors such that the first message processor and the one or more other message processors can communicate by transferring electronic messages, the computer program product for implementing a method for the first message processor to express to at least one of the other message processors how to derive a key that can be used to securely process an electronic message, the computer program product comprising one or more computer-readable media having stored thereon computer instructions, which when executed perform the method, the method comprising:

an act of receiving an electronic message including shared secret information from a second message processor prior to computing a key sequence, the shared secret information indicating one or more key derivation data elements;

an act of computing a key sequence of one or more randomly generated bytes based on the received shared secret information, a plurality of specific identifiable portions within the computed key sequence allocated for a plurality of corresponding different versions of a key such that any one of the plurality of keys can be identified within the key sequence depending on key derivation data;

an act of detecting that at least one key derivation data element is absent from the received one or more key derivation data elements included in the electronic message;

in response to the detection, an act of inferring the at least one absent key derivation data element form a second one or more key derivation data elements that the first and second message processor previously exchanged, the previously exchanged second one or more key derivation data elements providing a context for deriving keys form the computed key sequence;

an act of generating key derivation data from the one or more received key derivation data elements and the at least one inferred key derivation data element, the key derivation data used to identify a particular key from among the plurality of keys allocated within the computed key sequence;

an act of sending a security token that includes the generated key derivation data to express to at least one other message processor how to identify the particular key from within the computed key sequence such that an electronic message may be securely processed using the particular key;

an act of applying the generated key derivation data to the computed key sequence to identify the particular key from within the computed key sequence; and act of using the identified key to securely process the electronic message.

35. A computer program product for use in a distributed system including a first message processor that is communicatively coupled to one or more other message processors such that the first message processor and the one or more other message processors can communicate by transferring electronic messages, the computer program product for implementing a method for a second message processor from among the one or more other message processors to receive an expression of how to derive a key that can be used to securely process an electronic message, the computer program product comprising one or more computer-readable media having stored thereon computer instructions, which when executed perform the method, the method comprising:

an act of receiving security token that includes shared secret information and one or more key derivation data elements expressing how to identify a particular key from within a computed key sequence;

an act of computing a key sequence of one or more randomly generated bytes based on the received shared secret information, a plurality of specific identifiable portions within the computed key sequence allocated for a plurality of corresponding different versions of a key such that any one of the plurality of keys can be identified within the computed key sequence depending on key derivation data;

an act of detecting that at least one key derivation data element is absent from the received one or more key derivation data elements;

in response to the detection, an act of inferring the at least one absent key derivation data element from a second one or more key derivation data elements that the first and second message processor previously exchanged, the previously exchanged second one or more key derivation data elements providing a context for deriving keys from the computer key sequence;

an act of generating key derivation data from the one or more received key derivation data elements and the at least one inferred key derivation data element, the key derivation data used to identify a particular key from among the plurality of keys allocated within the computed key sequence;

an act of applying the generated key derivation data to the computed key sequence to identify the particular key from within the computed key sequence; and an act of using the identified key to securely process the electronic message.

* * * * *